United States Patent
Smith et al.

(10) Patent No.: US 10,379,742 B2
(45) Date of Patent: Aug. 13, 2019

(54) STORAGE ZONE SET MEMBERSHIP

(71) Applicant: NetApp, Inc., Sunnyvale, CA (US)

(72) Inventors: Maxim Gerard Smith, Durham, NC (US); John William Haskins, Jr., Wake Forest, NC (US); David Anthony Slik, Northridge, CA (US); Keith Arnold Smith, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/979,873

(22) Filed: Dec. 28, 2015

(65) Prior Publication Data
US 2017/0185312 A1    Jun. 29, 2017

(51) Int. Cl.
*G06F 3/06*    (2006.01)
*G11B 20/12*   (2006.01)

(52) U.S. Cl.
CPC .......... *G06F 3/0608* (2013.01); *G06F 3/0631* (2013.01); *G06F 3/0689* (2013.01); *G11B 20/1217* (2013.01); *G11B 2020/1242* (2013.01); *G11B 2020/1292* (2013.01)

(58) Field of Classification Search
CPC .... G06F 3/0608; G06F 3/0689; G06F 3/0631; G11B 20/1217; G11B 2020/1292; G11B 2020/1242; G11B 2020/1238; H04L 67/1019
See application file for complete search history.

(56) References Cited

U.S. PATENT DOCUMENTS

| | | | |
|---|---|---|---|
| 4,543,654 A * | 9/1985 | Jones | H04L 12/2801 370/445 |
| 5,271,012 A | 12/1993 | Blaum et al. | |
| 5,687,365 A | 11/1997 | Velissaropoulos et al. | |
| 6,115,200 A | 9/2000 | Allen et al. | |
| 6,505,216 B1 | 1/2003 | Schutzman et al. | |

(Continued)

FOREIGN PATENT DOCUMENTS

WO    2013152811 A1    10/2013

OTHER PUBLICATIONS

International Search Report and Written Opinion for Application No. PCT/US2015/048177 dated Dec. 10, 2015, 8 pages.

(Continued)

*Primary Examiner* — Rocio Del Mar Perez-Velez
(74) *Attorney, Agent, or Firm* — Cesari and McKenna, LLP (57) ABSTRACT

A storage system writes an object across zones of a set of zones ("zone set"). Each zone of a zone set is contributed from an independently accessible storage medium. To create a zone set, the storage system arbitrarily selects disks to contribute a zone for membership in the zone set. This results in a fairly even distribution of zone sets throughout the storage system, which increases fault tolerance of the storage system. Although disk selection for zone set membership is arbitrary, the arbitrary selection can be from a pool of disks that satisfy one or more criteria (e.g., health or activity based criteria). In addition, weights can be assigned to disks to influence the arbitrary selection. Although manipulating the arbitrary selection with weights or by reducing the pool of disks reduces the arbitrariness, this evenly distributes zone sets while accounting for client demand and/or disk health.

20 Claims, 6 Drawing Sheets

(56) References Cited

U.S. PATENT DOCUMENTS

| | | | |
|---|---|---|---|
| 6,714,371 B1 | 3/2004 | Codilian | |
| 6,735,033 B1 | 5/2004 | Codilian et al. | |
| 7,177,248 B2 | 2/2007 | Kim et al. | |
| 7,333,282 B2 | 2/2008 | Iseri et al. | |
| 7,408,732 B2 | 8/2008 | Kisaka et al. | |
| 8,099,605 B1 | 1/2012 | Billsroem et al. | |
| 8,239,621 B2 | 8/2012 | Yamato | |
| 8,375,012 B1 | 2/2013 | Graefe | |
| 8,566,520 B1* | 10/2013 | Bitner | G06F 3/0605 |
| | | | 711/114 |
| 8,625,636 B2 | 1/2014 | Baptist et al. | |
| 8,768,983 B2 | 7/2014 | Kohlscheen et al. | |
| 8,819,259 B2 | 8/2014 | Zuckerman et al. | |
| 8,838,911 B1 | 9/2014 | Hubin et al. | |
| 8,949,449 B2 | 2/2015 | Zuckerman et al. | |
| 8,959,281 B1 | 2/2015 | Malina et al. | |
| 8,959,305 B1 | 2/2015 | Lecrone et al. | |
| 8,990,162 B1 | 3/2015 | Kushwah et al. | |
| 9,269,376 B1 | 2/2016 | Hess et al. | |
| 9,329,991 B2 | 5/2016 | Cohen et al. | |
| 9,361,301 B1 | 6/2016 | Bushman | |
| 9,471,366 B2 | 10/2016 | Bolte et al. | |
| 2002/0095546 A1* | 7/2002 | Dimitri | G11B 20/1217 |
| | | | 711/112 |
| 2003/0105852 A1 | 6/2003 | Das et al. | |
| 2004/0153479 A1* | 8/2004 | Mikesell | G06F 16/182 |
| 2004/0162940 A1* | 8/2004 | Yagisawa | G06F 3/0607 |
| | | | 711/114 |
| 2004/0213149 A1 | 10/2004 | Mascolo | |
| 2005/0192932 A1* | 9/2005 | Kazar | G06F 16/10 |
| 2006/0253651 A1 | 11/2006 | Inoue et al. | |
| 2006/0271339 A1 | 11/2006 | Fukada | |
| 2007/0104049 A1 | 5/2007 | Kim et al. | |
| 2007/0113004 A1 | 5/2007 | Sugimoto et al. | |
| 2007/0156405 A1 | 7/2007 | Schulz et al. | |
| 2007/0177739 A1 | 8/2007 | Ganguly et al. | |
| 2007/0203927 A1 | 8/2007 | Cave et al. | |
| 2008/0126357 A1 | 5/2008 | Casanova et al. | |
| 2008/0151724 A1 | 6/2008 | Anderson et al. | |
| 2008/0201336 A1 | 8/2008 | Yamato | |
| 2008/0201401 A1 | 8/2008 | Pugh et al. | |
| 2008/0313398 A1* | 12/2008 | Koseki | G06F 3/0613 |
| | | | 711/114 |
| 2009/0100055 A1 | 4/2009 | Wang | |
| 2009/0154559 A1 | 6/2009 | Gardner | |
| 2009/0327840 A1 | 12/2009 | Moshayedi | |
| 2010/0030960 A1 | 2/2010 | Kamalavannan et al. | |
| 2010/0064166 A1 | 3/2010 | Dubnicki et al. | |
| 2010/0094921 A1 | 4/2010 | Roy et al. | |
| 2010/0094957 A1 | 4/2010 | Zuckerman et al. | |
| 2010/0095060 A1 | 4/2010 | Strange et al. | |
| 2010/0162031 A1 | 6/2010 | Dodgson et al. | |
| 2010/0185690 A1 | 7/2010 | Evans et al. | |
| 2010/0293354 A1 | 11/2010 | Perez et al. | |
| 2010/0306174 A1 | 12/2010 | Otani | |
| 2010/0325345 A1 | 12/2010 | Ohno et al. | |
| 2011/0191629 A1 | 8/2011 | Daikokuya et al. | |
| 2011/0296104 A1 | 12/2011 | Noda et al. | |
| 2012/0060072 A1 | 3/2012 | Simitci et al. | |
| 2012/0072689 A1 | 3/2012 | Kempen et al. | |
| 2012/0226886 A1 | 9/2012 | Hatfield et al. | |
| 2013/0054889 A1* | 2/2013 | Vaghani | G06F 3/0604 |
| | | | 711/114 |
| 2013/0086340 A1 | 4/2013 | Fleming et al. | |
| 2013/0238235 A1 | 9/2013 | Kitchel et al. | |
| 2013/0297905 A1 | 11/2013 | Yang et al. | |
| 2013/0346794 A1 | 12/2013 | Bartlett et al. | |
| 2014/0013046 A1* | 1/2014 | Corbett | G06F 12/00 |
| | | | 711/112 |
| 2014/0108707 A1 | 4/2014 | Nowoczynski et al. | |
| 2014/0207899 A1 | 7/2014 | Mark et al. | |
| 2014/0237024 A1 | 8/2014 | Chen et al. | |
| 2014/0297680 A1 | 10/2014 | Triou, Jr. et al. | |
| 2014/0331085 A1 | 11/2014 | Dhuse et al. | |
| 2014/0344532 A1 | 11/2014 | Lazier | |
| 2015/0067245 A1 | 3/2015 | Kruger | |
| 2015/0161163 A1* | 6/2015 | Cypher | G06F 17/30194 |
| | | | 707/610 |
| 2015/0254008 A1* | 9/2015 | Tal | G06F 3/0619 |
| | | | 711/114 |
| 2015/0256577 A1 | 9/2015 | Gutiérrez et al. | |
| 2015/0269964 A1 | 9/2015 | Fallone et al. | |
| 2015/0363126 A1* | 12/2015 | Frick | G06F 1/3203 |
| | | | 711/114 |
| 2015/0378825 A1 | 12/2015 | Resch | |
| 2016/0070617 A1 | 3/2016 | Algie et al. | |
| 2016/0179621 A1 | 6/2016 | Schirripa et al. | |
| 2016/0232168 A1* | 8/2016 | LeMoal | G06F 17/30091 |
| 2016/0314043 A1* | 10/2016 | Slik | G06F 11/1076 |
| 2017/0031752 A1 | 2/2017 | Cilfone et al. | |
| 2017/0060481 A1 | 3/2017 | Leggette et al. | |
| 2017/0109247 A1 | 4/2017 | Nakajima | |

OTHER PUBLICATIONS

Rabin "Efficient Dispersal of Information for Security, Load Balancing, and Fault Tolerance," Journal of the Association for Computing Machinery, vol. 36, No. 2, Apr. 1989, pp. 335-348.

Amer, et al., "Design Issue for a Shingled Write Disk System," 26th IEEE Symposium on Massive Storage Systems and Technologies (MSST 2010), May 2010,12 pages, retrieved on Oct. 20, 2015 from http://storageconference.us/2010/Papers/MSST/Amer.pdf.

Amer, et al.,"Data Management and Layout for Shingled Magnetic Recording," IEEE Transactions on Magnetics, Oct. 2011,vol. 47, No. 10,pp. 3691-3697, retrieved on Oct. 15, 2015 from http://www.ssrc.ucsc.edu/Papers/amer-ieeetm11.pdf.

Dunn, et al., "Shingled Magnetic Recording Models, Standardization, and Applications," SNIA Education, Storage Networking Industry Association,, Sep. 16, 2014, 44 pages, retrieved on Oct. 21, 2015 from http://www.snia.org/sites/default/files/Dunn-Feldman_SNIA_Tutorial_Shingled_Magnetic_Recording-r7_Final.pdf.

Feldman, et al., "Shingled Magnetic Recording Areal Density Increase Requires New Data Management," USENIX, The Advanced Computing Systems Association, Jun. 2013, vol. 38, No. 3, pp. 22-30, retrieved on Oct. 20, 2015 from https://www.cs.cmu.edu/~garth/papers/05_feldman_022-030_final.pdf.

Gibson, et al., "Direction for Shingled-Write and Two-Dimensional Magnetic Recording System Architectures: Synergies with Solid-State Disks," Carnegie Mellon University, Parallel Data Lab, Technical Report CMU-PDL-09-104, May 2009, 2 pages, retrieved on Oct. 20, 2015 from http://www.pdl.cmu.edu/PDL-FTP/PDSI/CMU-PDL-09-104.pdf.

Gibson, et al., "Principles of Operation for Shingled Disk Devices," Carnegie Mellon University, Parallel Data Laboratory, CMU-PDL-11-107, Apr. 2011, 9 pages, retrieved on Oct. 20, 2015 from http://www.pdl.cmu.edu/PDL-FTP/Storage/CMU-PDL-11-107.pdf.

Li, X., "Reliability Analysis of Deduplicated and Erasure-Coded Storage," ACM SIGMETRICS Performance Evaluation Review, vol. 38, No. 3, ACM New York, NY, Jan. 3, 2011, pp. 4-9.

Luo, "Implement Object Storage with SMR based Key-Value Store," 2015 Storage Developer Conference, Huawei Technologies Co., Sep. 2015, 29 pages, retrieved on Oct. 20, 2015 from http://www.snia.org/sites/default/files/SDC15_presentations/smr/QingchaoLuo_Implement_Object_Storage_SMR_Key-Value_Store.pdf.

Megans, "Spectra Logic Announces Breakthrough in Nearline Disk, ArcticBlue," Specta Logic, Boulder, CO, Oct. 15, 2015, 5 pages, retrieved on Oct. 20, 2015 from https://www.spectralogic.com/2015/10/15/spectra-logic-announces-breakthrough-in-nearline-disk-arcticblue/.

O'Reily; J., "RAID Vs. Erasure Coding", Network Computing,Jul. 14, 2014, 2 pages, retrieved on Apr. 1, 2016 from http://www.networkcomputing.com/storage/raid-vs-erasure-coding/1792588127.

Renzoni, R., "Wide Area Storage From Quantum," Quantum Corporation, 2012, 24 pages.

Seshadri S., "High Availability and Data Protection with EMC Isilon Scale-Out NAS," EMC Corporation, White Paper, Jun. 2015, (56) References Cited

OTHER PUBLICATIONS 37 pages, retrieved on Oct. 5, 2015 from https://www.emc.com/collateral/hardware/white-papers/h10588-isilon-data-availability-protection-wp.pdf.
SMR Layout Optimisation for XFS, Mar. 2015, v0.2, 7 pages, retrieved on Oct. 15, 2015 from http://xfs.org/images/f/f6/Xfs-smr-structure-0.2.pdf.
Speciale P., "Scality RING: Scale Out File System & Hadoop over CDMI," Scality, Storage Developer Conference, Sep. 19-22, 2014, 26 pages, retrieved on Oct. 5, 2015 from http://www.snia.org/sites/default/files/PaulSpeciale_Hadoop_Ring.pdf.
Suresh, et al., "Shingled Magnetic Recording for Big Data Applications," Parallel Data Laboratory, Carnegie Mellon University, Pittsburg, PA, CMU-PDL-12-105, May 2012, 29 pages, retrieved on Oct. 20, 2015 from http://www.pdl.cmu.edu/PDL-FTP/FS/CMU-PDL-12-105.pdf.

\* cited by examiner

STORAGE ZONE SET MEMBERSHIP

BACKGROUND

The disclosure generally relates to the field of storage systems, and more particularly to zoned storage systems.

Consumers and businesses are both storing increasing amounts of data with third party service providers. Whether the third party service provider offers storage alone as a service or as part of another service (e.g., image editing and sharing), the data is stored on storage remote from the client (i.e., the consumer or business) and managed, at least partly, by the third party service provider. This increasing demand for cloud storage has been accompanied by, at least, a resistance to increased price per gigabyte, if not a demand for less expensive storage devices. Accordingly, storage technology has increased the areal density of storage devices at a cost of device reliability instead of increased price. For instance, storage devices designed with shingled magnetic recording (SMR) technology increase areal density by increasing the number of tracks on a disk by overlapping the tracks.

Increasing the number of tracks on a disk increases the areal density of a hard disk drive without requiring new read/write heads. Using the same read/write head technology avoids increased prices. But reliability is decreased because more tracks are squeezed onto a disk by overlapping the tracks. To overlap tracks, SMR storage devices are designed without guard spaces between tracks. Without the guard spaces, writes impact overlapping tracks and a disk is more sensitive to various errors (e.g., seek errors, wandering writes, vibrations, etc.).

BRIEF DESCRIPTION OF THE DRAWINGS

Embodiments of the disclosure may be better understood by referencing the accompanying drawings.

DESCRIPTION

Terminology

The term "disk" is commonly used to refer to a disk drive or storage device. This description uses the term "disk" to refer to one or more platters that are presented with a single identifier (e.g., drive identifier).

Introduction

An SMR storage device presents sequences of sectors through multiple cylinders (i.e., tracks) as zones. Generally, an SMR disk does not allow random writes in a zone, although an SMR disk can have some zones configured for random writing. An SMR storage device initially writes into a zone at the beginning of the zone. To continue writing, the SMR storage device continues writing from where writing previously ended. This point (i.e., physical sector) at which a previous write ended is identified with a write pointer. As the SMR disk writes sequentially through a zone, the write pointer advances. Writes advance the write pointer through a zone until the write pointer is reset to the beginning of the zone or until the write pointer reaches the end of the zone. If a disk has more than one sequential zone, the zones can be written independently of each other. The number of zones and size of each zone can vary depending upon the manufacturer, and manufacturers can organize zones with guard bands between them.

Overview

A user/application level unit of data written to storage is referred to as an "object" herein. The write of a large object is referred to as "ingesting" the object since it often involves multiple write operations. When ingesting an object, a storage system can write parts of the object across different SMR disks for data durability and access efficiency, somewhat similar to striping data across a redundant array of independent disks (RAID). However, a RAID array uses a substantially smaller number of disks with static disk assignments, which results in data being clustered onto the disks of the RAID array. To meet larger scale demands while still providing data durability and access efficiency ("I/O efficiency"), a storage system can be designed to write an object across zones of a set of zones ("zone set"). Each zone of a zone set is contributed from an independently accessible storage medium (e.g., disks on different spindles). This avoids spindle contention, which allows for I/O efficiency when servicing client requests or when reconstructing data. To create a zone set, the storage system arbitrarily selects disks to contribute a zone for membership in the zone set. This results in a fairly even distribution of zone sets throughout the storage system. Otherwise, selection could be unintentionally biased to a subset of disks in the storage system (e.g., the first n disks) and data would cluster on these disks, which increases the impact of disk failures on the storage system. Although disk selection for zone set membership is arbitrary, the arbitrary selection can be from a pool of disks that satisfy one or more criteria (e.g., health or activity based criteria). In addition, weights can be assigned to disks to influence the arbitrary selection. Although manipulating the arbitrary selection with weights or by reducing the pool of disks reduces the arbitrariness, this evenly distributes zone sets while accounting for client demand and/or disk health.

Example Illustrations

Figure 1:
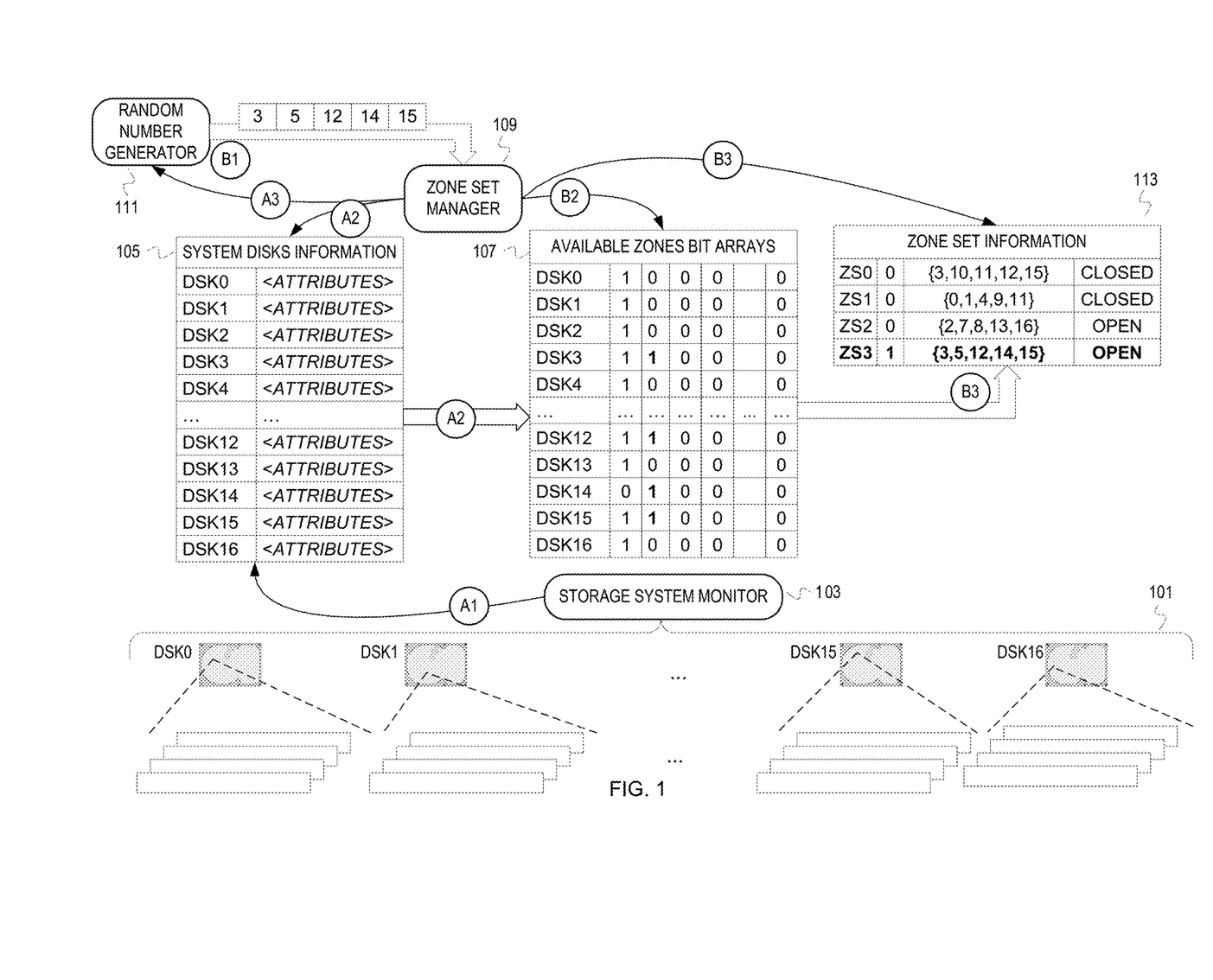
FIG. 1 is an example conceptual diagram of zone set creation.

FIG. 1 is an example conceptual diagram of zone set creation. A storage system 101 includes 17 storage devices, DSK0-DSK16. Deployments will likely have a greater number of storage devices, but a smaller number was chosen for this illustration. A storage system monitor 103 and a zone set manager 109 operate to discover disks in the storage system 101 and create zone sets based on that information. The zone set manager 109 arbitrarily selects disks for zone set creation based on input from a random number generator 111, although a pseudo-random number generator (e.g., a linear feedback shift register) can be used.

FIG. 1 is annotated with a series of identifiers A1-A3 and B1-B3. The series A1-A3 represents stages of operations for establishing a pool of zones available for zone set membership. The series B1-B3 represents stages of operations for creating a zone set from the pool of available zones. Although these stages are ordered for this example, the stages illustrate one example to aid in understanding this disclosure and should not be used to limit the claims. Subject matter falling within the scope of the claims can vary with respect to the order and some of the operations.

During an initialization and/or discovery phase, the storage system monitor 103 collects information about the disks of the storage system 101. The discovery phase can be part of initialization or may be triggered by a disk failure or disk install. When a disk fails or a disk is installed, the storage system monitor 103 updates the information. At stage A1, the storage system monitor 103 creates or updates system disks information 105. The system disks information 105 is depicted with a first column of disk identifiers and a second column of disk attributes based on the information collected from the storage devices of the storage system 101. The disk identifiers can be generated by the zone set manager 109 or the storage system monitor 103, or can be an external identifier (e.g., a manufacturer-specified globally unique identifier (GUID)). The disk attributes includes a number of zones, information about the zones (e.g., starting location, size of zones), and status of the disk (e.g., offline, available). The disk attributes can also indicate additional information about the disks, such as disk capacity, sector size, health history, activity, etc. The information collected by the storage system monitor 103 at least describes each currently operational storage device of the storage system 101, and may also describe former storage devices or storage devices not currently accessible.

At stage A2, the zone set manager 109 captures available zone information in bit arrays 107. The zone set manager 109 accesses the system disks information 105, and creates/updates the available zones bit arrays 107. The first column of the bit arrays 107 in FIG. 1 includes the disk identifiers. Each subsequent column indicates availability of a zone. A zone is unavailable if it has failed (e.g., has unrecoverable errors), if it is already in a zone set, or if the corresponding disk is unavailable (e.g., offline, failed, etc.). For each disk that is available, the zone set manager 109 initially sets the available bit to 0 for this example illustration, where 0 indicates that the corresponding zone is available. Implementations can represent "available" with a 1. When status of a disk changes, the change is reflected in the system disks information 105, and propagated to the available zones bit arrays 107. For instance, updating status of a disk to offline will cause the zone set manager 109 to indicate the disk or all zones of the disk are unavailable in the available zones bit arrays 107 (i.e., all bits corresponding to the disk in the bit array are set to 1). The bit arrays 107 may be stored uncompressed or compressed with various compression techniques, such as run-length encoding.

At stage A3, the zone set manager 109 sets parameters of the random number generator (RNG) 111. The zone set manager 109 can set parameters of the RNG 111 to randomly (or pseudo-randomly) generate numbers than can map to the storage devices. For example, the zone set manager 109 sets parameters of the RNG 111 to generate numbers between 0 and 16 in correspondence with the number of storage devices in the storage system 101.

At stage B1, the zone set manager 109 obtains disk selection values from the RNG 111 to create a zone set ZS3. The zone set manager 109 requests a number of values from the RNG 111 sufficient for width of a zone set. In this illustration, zone set width is 5 zones. The zone set manager 109 obtains the disk selection values {3,5,12,14,15} from the RNG 111. Embodiments can select more values than the zone set width from the RNG 111 in anticipation that some values may correspond to disks that are unavailable or otherwise unsuitable for use in the constructed zone set. Embodiments can also obtain values from the RNG 111 on an as-needed basis.

At stage B2, the zone set manager 109 accesses the available zones bit arrays 107 to identify disks with identifiers that correspond to the disk selection values from the RNG 111. For this illustration, the values 3, 5, 12, 14, and 15 correspond to DSK3, DSK5, DSK12, DSK14, and DSK15, respectively. Correspondence between the randomly generated values and the disk identifiers can vary. For instance, the RNG 111 could generate values from a larger range of values and a modulo operation could be used to resolve the value to a disk identifier. This example illustration presumes that all disks corresponding to the disk selection values are available. As will be discussed in the flowcharts, a storage system can perform other operations to determine availability of a disk and/or zone. According to the available zones bit arrays 107, the first zone (e.g., zone 0) of the disks DSK3, DSK12, and DSK15 are not available. As shown in zone set information 113, zone 0 of DSK3, DSK12, and DSK15 are already members of zone set ZS0. DSK14 is the only disk with zone 0 available according to the zone set information 113. Since there are insufficient available zone 0's to create zone set ZS3, the zone set manager 109 creates zone set ZS3 from zone 1 of the disks DSK3, DSK5, DSK12, DSK14, and DSK15, and updates the available zones bit arrays 107 accordingly. In this example illustration, setting a bit to 1 in the bit arrays 107 indicates that a zone is no longer available. The available zones bit arrays 107 can also have a field to indicate disk status explicitly. Or the available zones bit arrays 107 can mark all zones of a disk as unavailable if the disk is unavailable. For simplicity, this example presumes that the constructed zone set will be comprised of similarly identified zones from all contributing disks, such as zone 1 from each disk in the zone set. Embodiments can select an arbitrary zone from each contributing disk, and are not limited to all zones in a zone set having zones with the same zone identifier in their respective contributing disks.

At stage B3, the zone set manager 109 updates the zone set information 113 to indicate membership of zone set ZS3. The zone set manager 109 adds an entry into the zone set information 103 that identifies ZS3, zone 1, and each disk that contributes zone 1 to zone set ZS3.

The zone set information 113 shows 2 closed zone sets and 2 open zone sets with the creation of ZS3. The zone set manager 109 creates zone sets on-demand after creating an initial configurable number of zone sets, or does not create initial zone sets. The zone set manager 109 can create a zone set for writing and wait to create another until the current zone set is full or has insufficient remaining capacity. Creating zone sets on-demand facilitates use of on disk information proximate to a write into the zone set. Choosing disks for zone sets such that many groups of zone sets are constructed that share no disks in common among zone sets in the group facilitates access to zone sets from such groups simultaneously, in parallel, or overlapped without contention for their underlying disks.

The above example illustration uses a relatively small number of disks. Statistics based on a larger storage system, for example 48 disks, more clearly illustrate the effectiveness of arbitrary disk selection that has been discovered. For the example 48 disk system, data is encoded with Reed Solomon coding. The Reed Solomon coding yields 18 erasure coded data fragments that allow data to be reconstructed as long as 16 fragments are available. Accordingly, zone set width for the data is 18. The storage system will write each of the 18 data fragments into a different zone that constitutes the zone set. If 2 zone sets are open having widths of 18, then 36 of the 48 disks have contributed a zone into one of the 2 zone sets. If the system suffers a 3 disk failure, then there is a ~4.7% probability ((18/48)*(17/47)*(16/46)) that the failures will impact a same zone set. With these 2 zone sets created, there is a 90.6% probability of data loss from a triple disk failure in the 48 disk system since there is a 4.7% probability that the triple disk failure will impact one of the 2 zone sets (90.6=100−(2*4.7).

FIGS. 2-5 depict flowchart of example operations related to zone set creation. The flowcharts refer to a zone set manager as performing the operations for ease or reading and consistency with FIG. 1. However, a program can be structured and/or named in different ways according to platform, programming language, developer, hardware constraints, etc.

Figure 2:
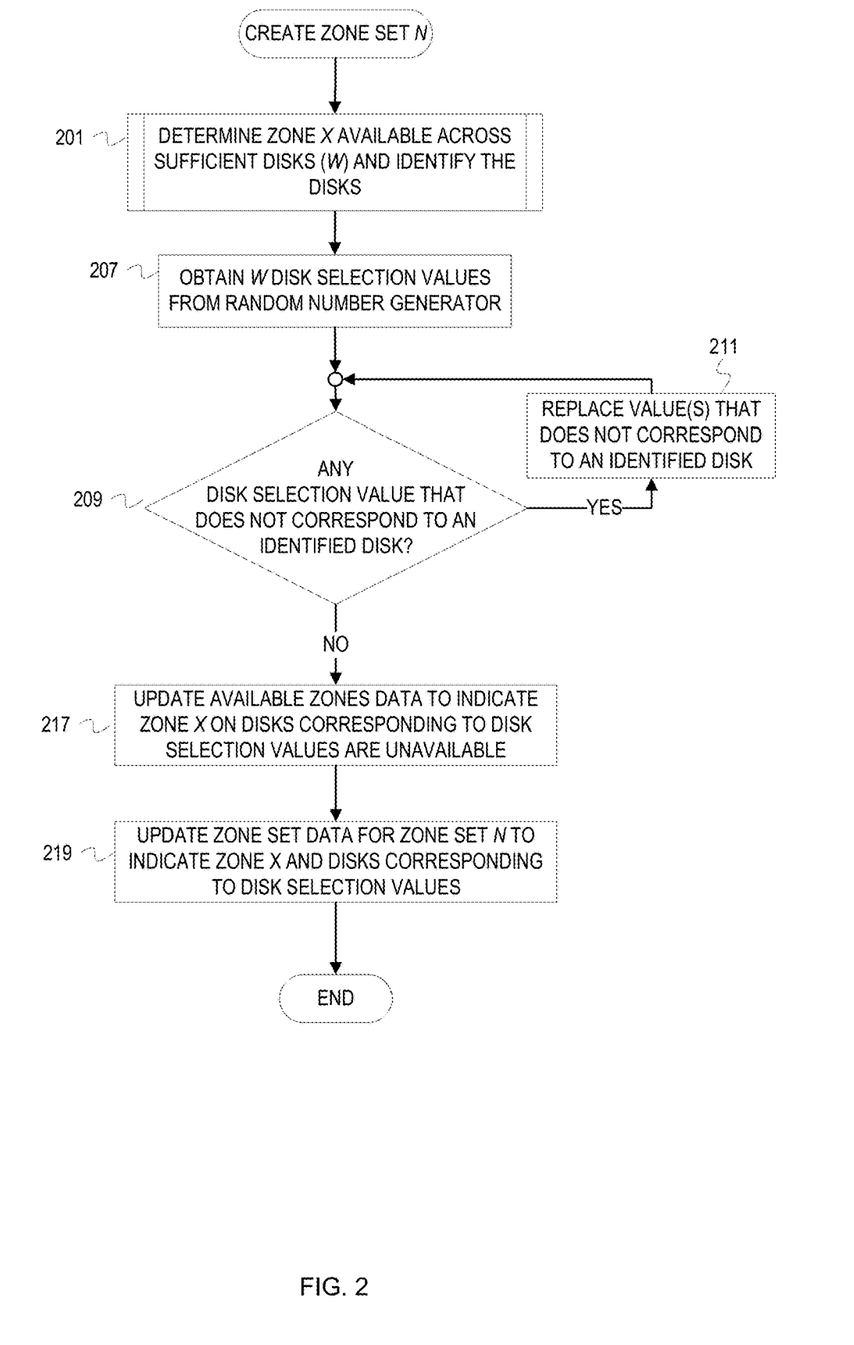
FIG. 2 depicts a flowchart of example operations for creating a zone set.

FIG. 2 depicts a flowchart of example operations for creating a zone set. The flowchart presumes creation of a single zone set N in response to some trigger. The trigger may be a user request to create a zone set, an operating system or file system request to create a zone set, detection of a zone set closing, etc.

Figure 3:
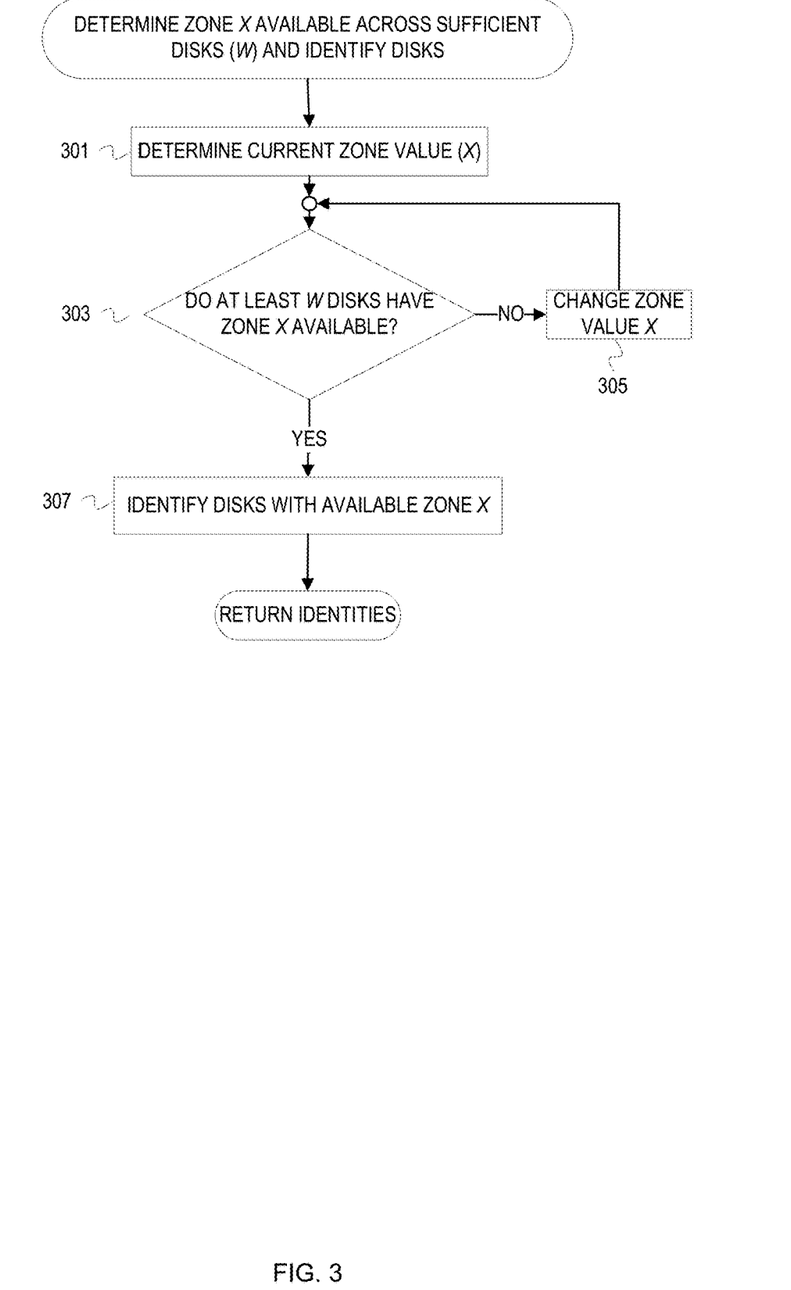
FIG. 3 depicts a flowchart of example operations for determining which zone is available across a sufficient number of disks, with the sufficient number defined by W.

At block 201, a zone set manager determines a zone X available across a sufficient number of disks W, and identifies those disks. For this example, sufficient disks W corresponds to zone set width. In an example with zone 0 reserved and a protection scheme that yields 18 data fragments, the zone set manager initially determines whether the storage system has 18 disks with zone X available based on the status information obtained from the storage devices. FIG. 3 elaborates more on this operation.

At block 207, the zone set manager obtains W disk selection values from a RNG or pseudo-RNG (hereinafter RNG will be used to refer to both a RNG and a pseudo-RNG). The zone set manager either requests the RNG for W values or makes W requests for a random value. The zone set manager discards repeat values until all W values are unique with respect to the set of disk selection values.

At block 209, the zone set manager determines whether any of the disk selection values do not correspond to one of the identified disks. The zone set manager determines whether each of the disk selection values from the RNG corresponds to one of the identified disks that has zone X available. If a disk selection value does not correspond to one of the identified disks, then a different random disk selection value should be obtained at block 211. Otherwise, control flows to block 217.

At block 211, the zone set manager replaces the one or more disk selection values that did not correspond to any of the identified disks. The zone set manager uses the RNG again to obtain the values and discards any repeat of the values being replaced. Control flows from block 211 back to block 209.

At block 217, the zone set manager updates data that indicates availability of zone X in the storage system. In particular, the zone set manager updates availability data to indicate that zone X on the disks corresponding to the disk selection values are no longer available. If bit arrays are used, the zone set manager accesses the array corresponding to zone X and updates each entry corresponding to the zone selection values to indicate the zones are no longer available.

At block 219, the zone set manager updates zone set data to reflect membership of the created zone set N. The zone set manager updates the zone set data to identify zone set N, to indicate zone X, and to indicate the contributing disks which correspond to the disk selection values.

FIG. 3 depicts a flowchart of example operations for determining which zone is available across a sufficient number of disks, with the sufficient number defined by W. Using a same zone identifier across disks limits location metadata (1 zone identifier is stored). Since member zones of a zone set have a same zone identifier, determining available disks to contribute zones may be done efficiently from a zone perspective instead of a disk perspective.

At block 301, a zone set manager determines a current zone value X. The storage system can store a current zone value X to track progress through zones as zone sets are created and used. To avoid imbalanced use of the outer zones of disks, zone set creation can advance through all non-reserved, available zones. Using the example of a 48 disk storage system with an 18 zone set width, two zone sets could be created per non-reserved zone identifier. Two zone sets from zone 1 will occupy 36 disks. The remaining 12 disks are insufficient for the zone set width, so zone set creation will advance to zone 2. Thus, when available zones for a zone set identifier become insufficient for the zone set width, the value X is updated.

At block 303, the zone set manager determines whether at least W disks have zone X available. The zone set manager reads data that indicates availability of zones per disk to make the determination. For instance, the zone set manager can read a bit array for zone X and count each entry with a bit that indicates the zone is available on the corresponding disk. If at least W disks do not have zone X available, then control flows to block 305. Otherwise, control flows to block 307.

At block 305, the zone set manager updates the current zone value X. The zone set manager can increment X and then validate the result against the size of the storage system. The zone set manager can simply do a relative comparison to determine whether incremented X is greater than the total number of available disks. Or the zone set manager can perform a modulo operation on X with the total number of available disks, and set X to the result of the modulo operation. Control returns to block 303 from block 305.

At block 307, the zone set manager identifies the disks with the available zone X. The zone set manager has determined that there are sufficient disks (e.g., at least W) that can contribute zone X to the zone set N. Using the bit arrays example, the zone set manager traverses the bit array for zone X and resolves each entry with the "available" bit set to a disk identifier. The zone set manager can generate a list of these disk identifiers (or the bit array indices) for later comparison against the disk selection values.

Although arbitrary selection should distribute zone sets approximately evenly across disks of a storage system, other factors may warrant some influence over the selection. For instance, the storage devices may be of different ages and/or different manufacturers. Thus, health and/or reliability of the storage devices can vary. To account for a storage system of heterogeneous devices and possibly a sequence of disk selection values that cluster, a zone set manager can apply one or more eligibility criteria to available disks and arbitrarily select from available, eligible disks.

Figure 4:
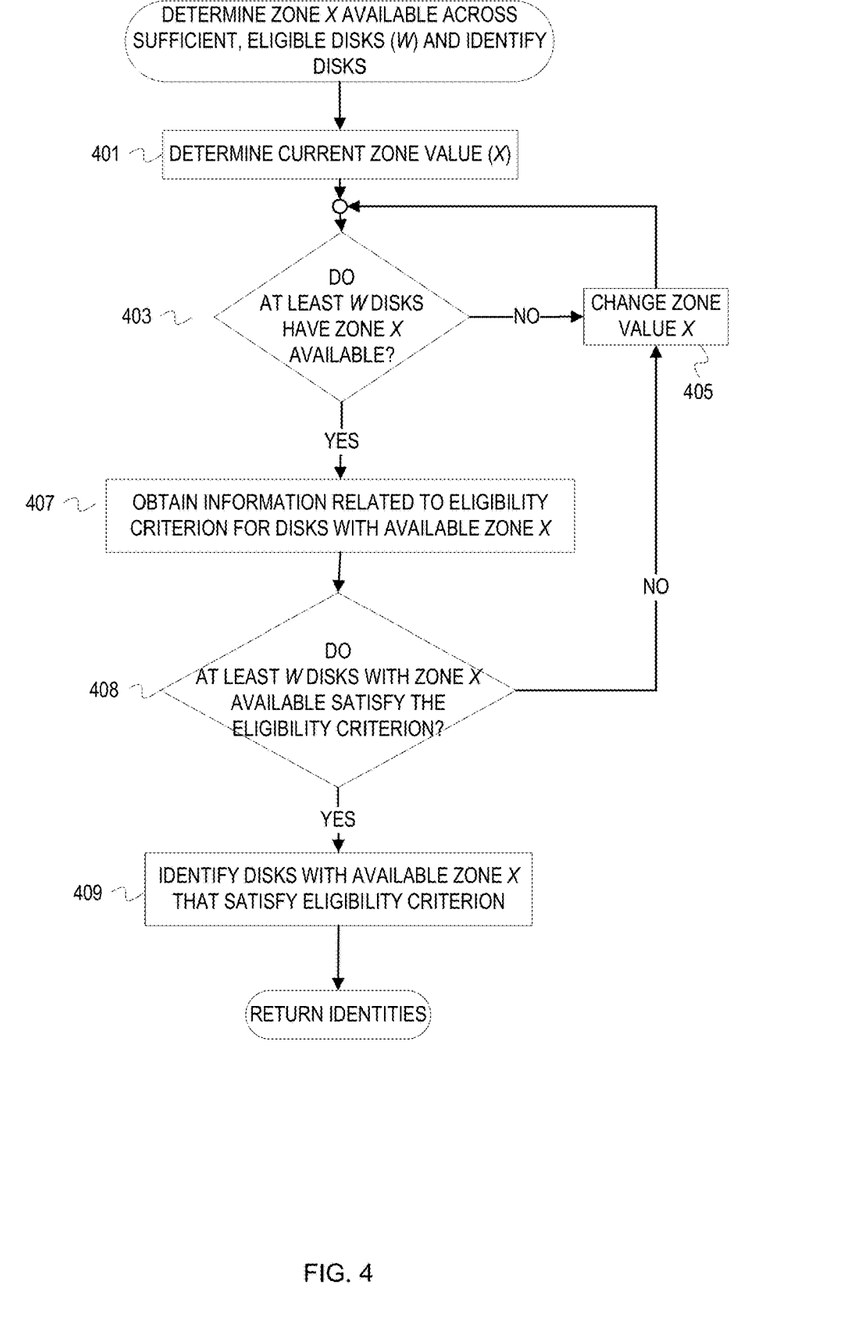
FIG. 4 depicts a flowchart of example operations for determining which zone is available across a sufficient number of eligible disks, with sufficient being defined by W.

FIG. 4 depicts a flowchart of example operations for determining which zone is available across a sufficient number of eligible disks, with sufficient being defined by W. The operations of FIG. 4 are similar to those of FIG. 3, with the exception of blocks 407 and 408.

At block 401, a zone set manager determines a current zone value X. The storage system can store a current zone value X to track progress through zones as zone sets are created and used.

At block 403, the zone set manager determines whether at least W disks have zone X available. The zone set manager reads data that indicates availability of zones per disk to make the determination. For instance, the zone set manager can read a bit array for zone X and count each entry with a bit that indicates the zone is available on the corresponding disk. If at least W disks do not have zone X available, then control flows to block 405. Otherwise, control flows to block 407.

At block 405, the zone set manager updates the current zone value X. The zone set manager can increment X and then validate the result against the size of the storage system. The zone set manager can do a relative comparison to determine whether incremented X is greater than the total number of available disks. Or the zone set manager can perform a modulo operation on X with the total number of available disks, and set X to the result of the modulo operation. Control returns to block 403 from block 405.

At block 407, the zone set manager obtains information related to the eligibility criterion for the disks determined to have zone X available. An eligibility criterion can relate to performance, health, and/or activity. For instance, a zone set manager can set a performance criterion for one or more zone sets that are bound to a quality of service requirement. The zone set manager can obtain performance information about the storage devices from the attribute information collected from the storage devices. For a health related criterion example, the zone set manager can apply a criterion based on a specific aspect of health (e.g., read error rate, reallocated sectors count, spin retry count) or a quantification of overall health. The zone set manager can obtain current health information from a Self-Monitoring, Analysis and Reporting Technology (S.M.A.R.T.) system. For an activity related criterion example, the zone set manager can apply a criterion that disqualifies a disk from selection based on number of input/output (I/O) accesses within a preceding time period to avoid disrupting storage devices busy servicing client requests. The zone set manager can obtain I/O information from the storage devices.

At block 408, the zone set manager determines whether at least W of the disks with zone X available satisfy the eligibility criterion. The zone set manager can traverse a bit array for zone X and evaluate the eligibility information for each disk corresponding to an entry in the zone X bit array that indicates "available." The zone set manager can create a list of the entries corresponding to disks determined to be eligible. If at least W of the disks with zone X available do not satisfy the eligibility criterion, then control flows to block 405. Otherwise, control flows to block 409. The zone set manager can maintain a retry counter that indicates a number of times at least W disks with zone X available failed the eligibility criterion. Repeated failure to identify sufficient disks that satisfy the eligibility criterion may relate to a system issue. Exceeding the retry counter can cause a notification to be generated.

At block 409, the zone set manager identifies the eligible disks with the available zone X. The zone set manager has determined that there are sufficient disks (e.g., at least W) that are eligible and that can contribute zone X to the zone set N. The zone set manager can return the already generated list of entry indices that correspond to eligible disks, or resolve the entry indices to the disk identifiers and return the disk identifiers.

In addition (or instead of) arbitrarily selecting from eligible disks, a storage system in accordance with this disclosure can use weights to preferentially select from the already arbitrarily selected disks. Similar to the eligibility criterion, the weights can be related to disk performance information, disk health information, and/or disk I/O access information.

Figure 5:
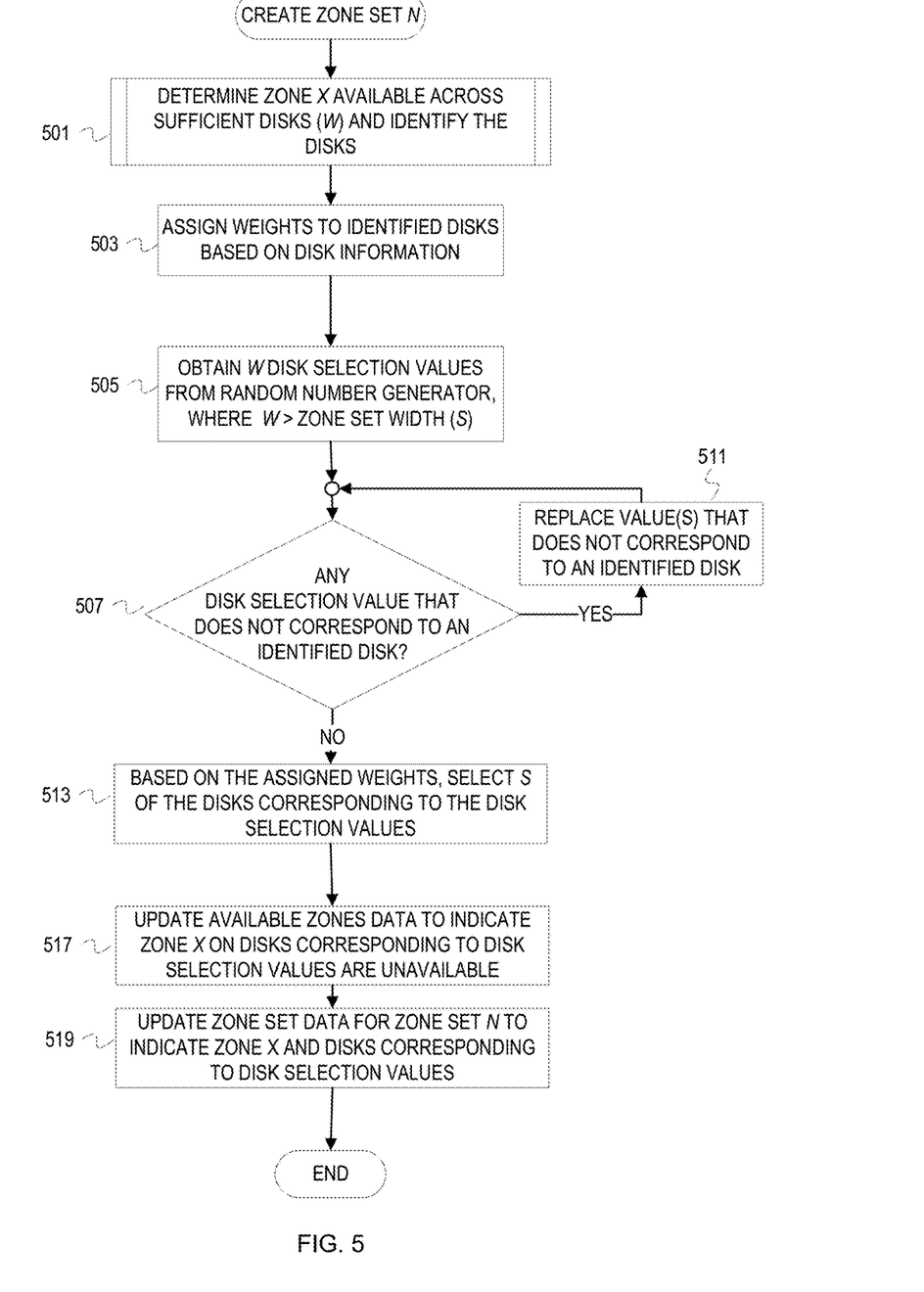
FIG. 5 depicts a flowchart of example operations for zone set creation in accordance with weighting.

FIG. 5 depicts a flowchart of example operations for zone set creation in accordance with weighting. Weighting can be applied to disk attributes to compute a weight that is assigned to a disk. If a single attribute is used for weighting, then a weight can be assigned to a disk based on this single attribute. In the case of weighting of disk attributes, weights can be determined in advance or on-demand. Using health information as an example, greater weight can be assigned to spin retry counts than seek time performance in advance of zone set creation. For an on-demand example, weight assignment (e.g., which weights are assigned to which disk attribute and the amount of the weights) can vary depending on a class of a zone set being created. A zone set may be designated with a class that corresponds to quality of service.

At block 501, a zone set manager determines a zone X available across a sufficient number of disks W, and identifies those disks. In this example, the sufficient number W is a value greater than width of the zone set.

At block 503, the zone set manager assigns weights to the identified disks based on disk information. The zone set manager determines which disk attributes affect weighting. Configuration data can specify the weighting system. The zone set manager obtains information about the disk attributes that affect weighting for each identified disk and calculates the weight to assign to the identified disk.

At block 505, the zone set manager obtains W disk selection values from a RNG. The zone set manager either requests the RNG for W values or makes W requests for a random value. The zone set manager discards repeat values until all W values are unique with respect to the set of disk selection values. The sufficient number W is greater than the zone set width (S) to allow for preferential selection based on weights.

At block 507, the zone set manager determines whether any of the disk selection values does not correspond to one of the identified disks. The zone set manager determines whether each of the disk selection values from the RNG corresponds to one of the identified disks that has zone X available. If a disk selection value does not correspond to one of the identified disks, then a different random disk selection value should be obtained at block 511. Otherwise, control flows to block 513.

At block 511, the zone set manager replaces the one or more disk selection values that did not correspond to any of the identified disks. The zone set manager uses the RNG again to obtain the values and discards any repeat of the values being replaced. Control flows from block 511 back to block 507.

At block 513, the zone set manager selects S of the disks corresponding to the disk selection values based on the assigned weights. Assuming a greater weighted value corresponds to greater preference, the zone set manager selects the S disks with the greatest assigned weights. In some cases, less weighted value can correspond to greater preference.

At block 517, the zone set manager updates data that indicates availability of zones in the storage system. The zone set manager updates this zones availability data to indicate that zone X on the selected S disks are no longer available. If bit arrays are used, the zone set manager accesses the array corresponding to zone X and updates each entry corresponding to the selected S zone selection values to indicate the zones are no longer available.

At block 519, the zone set manager updates zone set data to reflect membership of the created zone set N. The zone set manager updates the zone set data to identify zone set N, to indicate zone X, and to indicate the contributing disks which correspond to the S selected disks.

Variations

Embodiments can use an RNG differently. Although only FIG. 5 depicts operations that obtain more disk selection values than sufficient for zone set width, other embodiments can use a greater number of disk selection values. For instance, embodiments can obtain a set of disk selection values in advance (e.g., at startup) and consume as many of the pre-generated disk selection values to create a zone set each time a zone set is to be created. In addition, embodiments can forgo use of the RNG when available disks are at or close to the zone set width. If a storage system has a number of disks that are close or equal to a multiple of zone set width, then embodiments can choose the remaining disks without the use of disk selection values from the RNG. The inverse could also be done. If 20 disks remain for a zone set with width 18, a zone set manager can obtain 2 disk selection values from an RNG and not use the disks corresponding to those 2 disk selection values to create the zone set.

The previously discussed weights and disk eligibility criteria accounted for disks with different health and different I/O activity, which may be due to heterogeneity of the storage system (e.g., different ages, different manufacturers, etc.). Embodiments can prioritize which attributes are weighted and/or which eligibility criteria are applied. Embodiments can also set conditions for application of weights and/or an eligibility criterion. Prioritization and/or conditions may be related to service requirements (QoS, service level objectives, etc.). A zone set being created may be assigned a service requirement based on a requesting customer, the type of object being written, etc. For a zone set that may be assigned a higher class of service, weights and/or an eligibility criterion that relate to disk throughput may be prioritized to influence zone set membership.

The above examples use a same zone across disks to create a zone set, but this is not necessary. A zone set can be created with different zones. The zone set membership metadata would identify each disk and the particular zone contributed from each disk. Embodiments can construct zone sets with differently identified zones, can use zones that were skipped over, and can use differently identified zones to "patch" zone sets in which a member zone fails or otherwise becomes unavailable. Embodiments can generally use a same zone across disks, and then specify a condition for forming a zone set with different zones (i.e., different zone identifiers). A zone set manager can periodically scan the available zones data and determine whether "holes" exist. A hole can be one or more zones on a disk that have been skipped over. To illustrate, disk DSK37 may have zones 1-5 available even though the zone set manager is currently creating a zone set with zone 15 across disks. The zone set manager may fill in these holes by using these zones to create zone sets when insufficient disks are available to create a zone set. For instance, the zone set manager may only have 17 eligible disks with zone 15 available for a zone set having a width of 18. The zone set manager can elect to use zone 1 from disk DSK37 for the zone set as long as none of the other 17 disks are DSK37. For patching, embodiments can select a zone regardless of zone identifier to replace a failed/unavailable zone in a zone set.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations could obtain the disk selection values and then determine whether corresponding disks have a particular zone available. As another example, the operations of FIG. 4 could be modified to determine disks that satisfy the one or more eligibility criteria and then determine whether there are a sufficient number of the eligible disks with zone X available. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The examples refer to a zone set manager as performing many of the operations. "Zone set manager" is a construct to encompass the program code executable or interpretable to perform the operations. Program code to implement the functionality can be referred to a different name. Implementations will vary by programming language(s), programmer preferences, targeted platforms, etc. In addition, the program code may be implemented as a single module/function/method, multiple modules/functions/methods, a single library file, multiple libraries, kernel code of a storage operating system, an extension to a storage operating system, subsystem, etc. The program code can be instantiated as an administrative process(es) (e.g., instantiated for an administrator console or interface), an operating system process, and/or instantiated as a background process(es). The program code would be deployed on a node (e.g., server, virtual machine, blade, server processor, etc.) that is connected to storage devices and that manages reads and writes targeting the storage devices. For example, a storage rack can comprise multiple arrays of storage devices connected to processing hardware (i.e., a node) via network connections (e.g., Ethernet cables) and via on-board connections (e.g., small computer system interface (SCSI) cables).

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium. A machine-readable storage medium does not include transitory, propagating signals.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
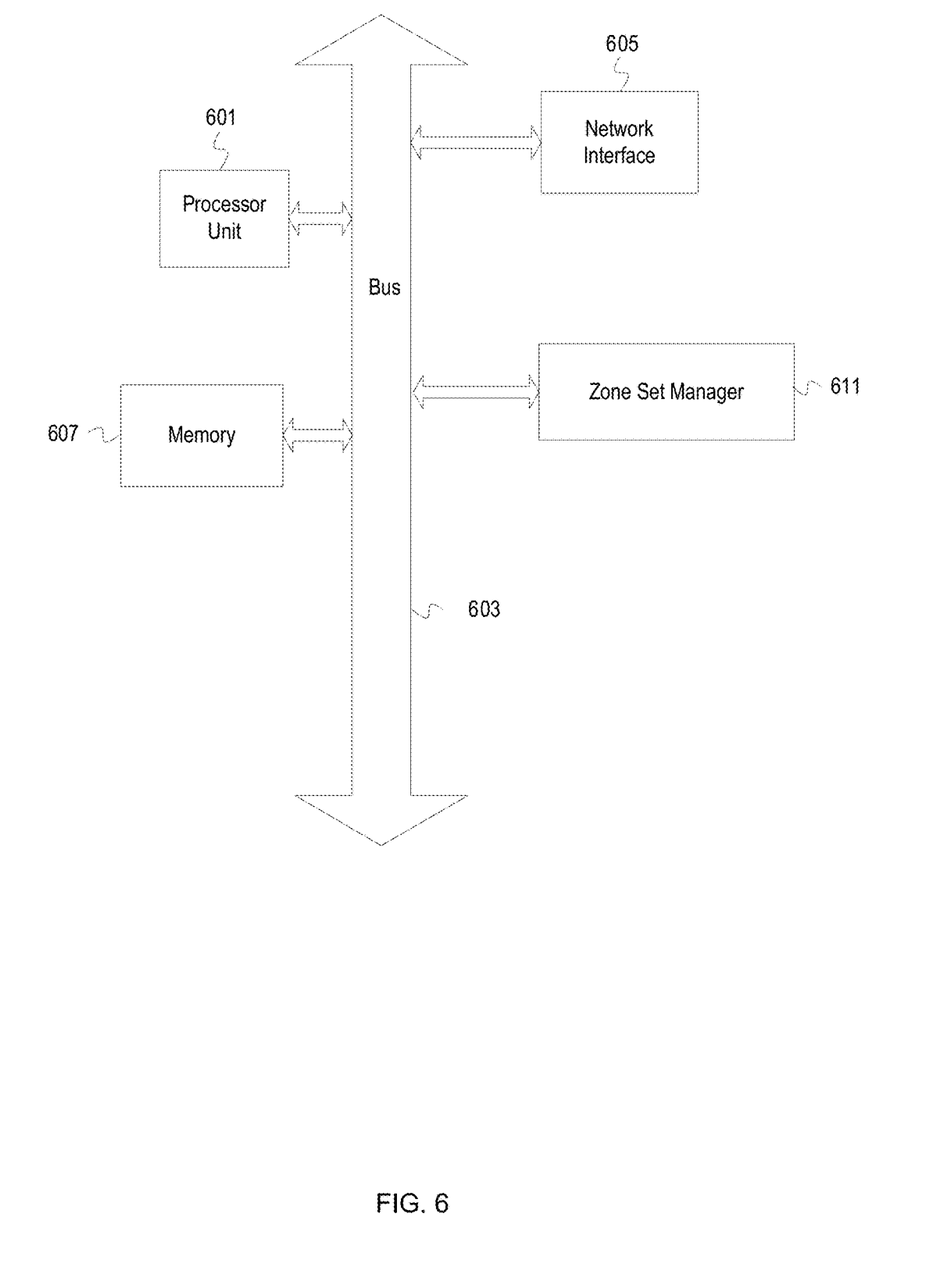
FIG. 6 depicts an example computer system with a zone set manager.

FIG. 6 depicts an example computer system with a zone set manager. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a zone set manager 611. The zone set manager 611 arbitrarily selects disks to contribute zones to form a zone set. As previously described, the arbitrary selection is informed by a random number generator or pseudo-random number generator and can be influenced by weighting of attributes and/or disk eligibility criteria. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for zone set creation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise stated, use of the phrase "at least one of" before a list conjoined by "and" is non-exclusive in the claims. For instance, X comprises at least one of A, B, and C can be infringed by {A}, {B}, {C}, {A, B}, etc., and does not require all of the items of the list to be X. In addition, this language also encompasses an X that includes another item, such as {A, B, P}.

What is claimed is:

1. A method comprising:
   determining whether a predetermined number of storage devices in a storage system have a zone available for writing, wherein the predetermined number corresponds to a protection scheme of the storage system, wherein the zone is associated with a zone identifier;
   in response to determining that the predetermined number of storage devices have the available zone,
      selecting at random a set of storage devices from the storage devices, wherein a number of the set of storage devices is at least equal to the predetermined number; and
      creating a set of zones from available zones of the set of storage devices, wherein a first zone of the zone set is skipped over from a prior zone set creation, wherein a subset of the zones of the zone set is associated with a same zone identifier, and wherein the subset of zones and the first zone are associated with different zone identifiers.

2. The method of claim 1, wherein a service level criterion is based on health information of the set of storage devices.

3. The method of claim 1, wherein creating the zone set further comprises storing metadata that (i) identifies the zone set, (ii) indicates the different zone identifiers of the zones of the zone set, and (iii) identifies the set of storage devices.

4. The method of claim 1 further comprising maintaining metadata that indicates availability of the available zones across the storage system based on information collected from the storage devices.

5. The method of claim 4, wherein maintaining data that indicates availability of the available zones across the storage system further comprises maintaining a bit array for each zone identifier in the storage system, wherein the bit array includes an entry for each storage device in the storage system.

6. The method of claim 4, wherein selecting the first set of storage devices further comprises:
scanning the metadata to determine that the first zone was skipped over from the prior zone set creation.

7. The method of claim 1 further comprising writing data fragments of an object to the zone set, wherein each of the data fragments is written into a different one of the zones of the zone set.

8. A non-transitory machine-readable storage medium having program code for creating a set of zones of a plurality of storage devices, the program code comprising instructions to:
determine whether a predetermined number of the plurality of storage devices have a zone available for writing, wherein the predetermined number corresponds to a protection scheme of the plurality of storage devices, wherein the zone is associated with a zone identifier;
in response to determining that there is a predetermined number of the storage devices having a zone available for writing,
select at random a set of storage devices from the plurality of storage devices, wherein a number of the set of storage devices is at least equal to the predetermined number; and
create a set of zones from available zones of the set of storage devices, wherein a first zone of the zone set is skipped over from a prior zone set creation, wherein a subset of the zones of the zone set is associated with a same zone identifier, and wherein the subset of zones and the first zone are associated with different zone identifiers.

9. The non-transitory machine-readable storage medium of claim 8, wherein the selected storage devices satisfy a service level criterion of the first set of storage devices.

10. The non-transitory machine-readable storage medium of claim 8, wherein the instructions to create the zone set further comprise instructions to store metadata that (i) identifies the zone set, (ii) indicates the different zone identifiers for the zones of the zone set, and (iii) identifies the set of storage devices.

11. The non-transitory machine-readable storage medium of claim 8, wherein the program code further comprises instructions to maintain metadata that indicates availability of the available zones across the plurality of storage devices based on information collected from the plurality of storage devices.

12. The non-transitory machine-readable storage medium of claim 11, wherein the instructions to maintain data that indicates availability of the available zones across the plurality of storage devices further comprise instructions to maintain a bit array for each zone identifier of the storage devices, wherein each bit array includes an entry for each of the plurality of storage devices.

13. The non-transitory machine-readable storage medium of claim 11, wherein the instructions to select the first set of storage devices further comprise instructions to:
scan the metadata to determine that the first zone was skipped over from the prior zone set creation.

14. The non-transitory machine-readable storage medium of claim 8, wherein the program code further comprises instructions to write data fragments of an object to the zone set, wherein each of the data fragments is written into a different one of the zones of the zone set.

15. An apparatus comprising:
a processor coupled to a plurality of storage devices; and
a machine-readable medium having program code executable by the processor to cause the apparatus to,
determine whether a predetermined number of the storage devices have a zone available for writing, wherein the predetermined number corresponds to a protection scheme of the storage devices, wherein the zone is associated with a zone identifier;
in response to determining that there is a predetermined number of storage devices having a zone available for writing,
select at random a set of storage devices from the storage devices, wherein a number of the set of storage devices is at least equal to the predetermined number; and
create a set of zones from available zones of the set of storage devices, wherein a first zone of the zone set is skipped over from a prior zone set creation, wherein a subset of the zones of the zone set is associated with a same zone identifier, and wherein the subset of zones and the first zone are associated with different zone identifiers.

16. The apparatus of claim 15, wherein the first zone is included on a first storage device having a failed zone associated with the same zone identifier that is associated with the subset of zones of the zone set.

17. The apparatus of claim 15, wherein the storage devices include zones physically restricted from random writing.

18. The method of claim 1, wherein the storage devices include zones physically restricted from random writing.

19. The method of claim 1 wherein the first zone is included on a first storage device of the set of storage devices having a failed zone associated with the same zone identifier that is associated with the subset of zones of the zone set.

20. The non-transitory machine-readable storage media of claim 8, wherein the first zone is included on a first storage device of the set of storage devices having a failed zone associated with the same zone identifier that is associated with the subset of zones of the zone set.

* * * * *